United States Patent Office 3,421,492
Patented Jan. 14, 1969

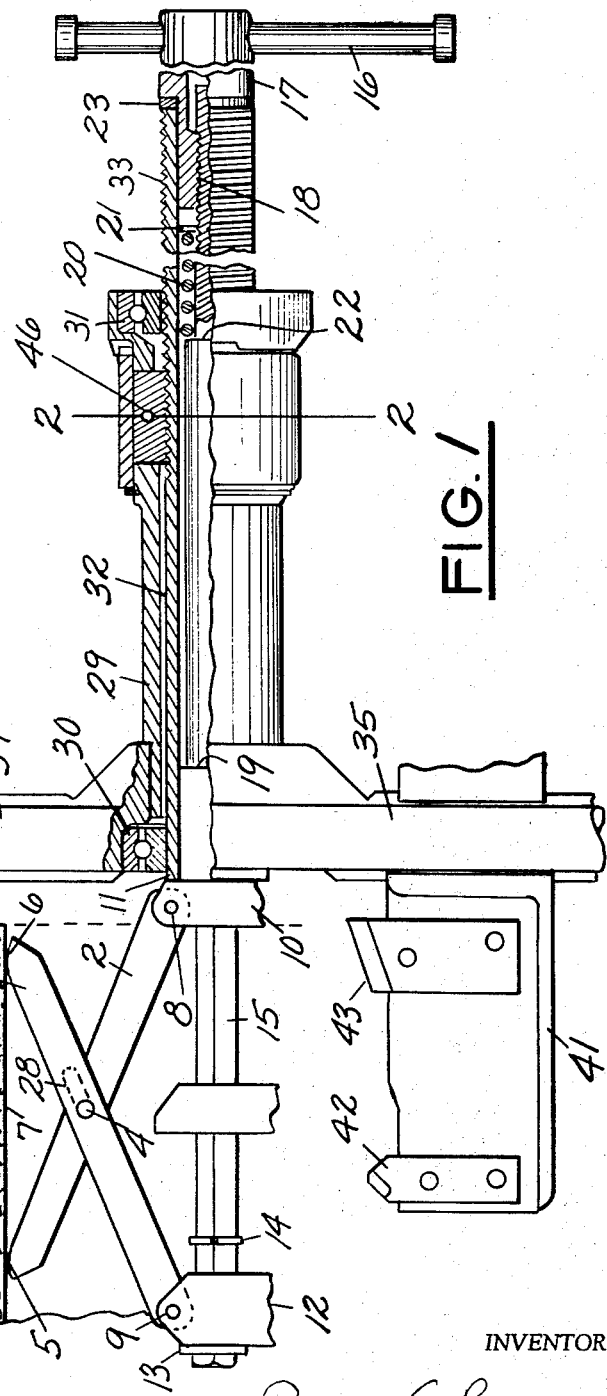
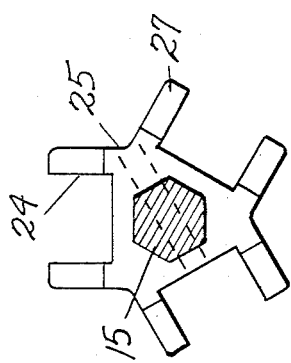

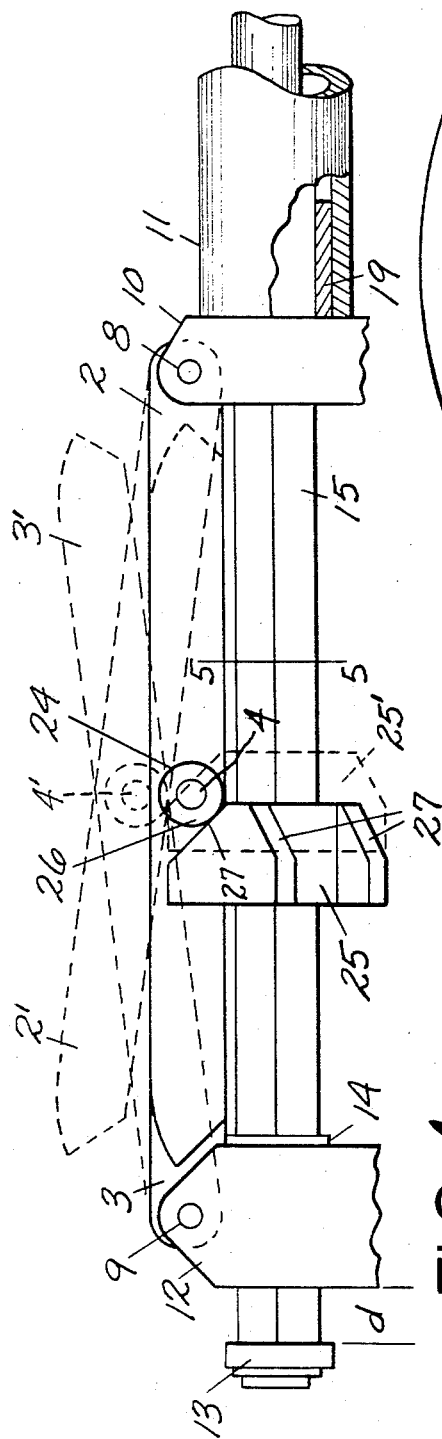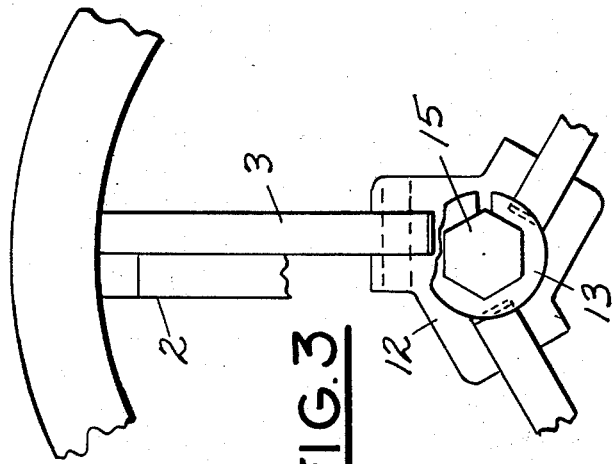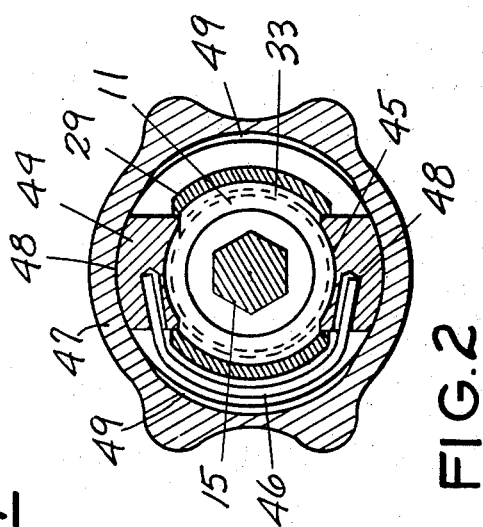

3,421,492
PIPE FINISHING TOOL
Thomas G. Brown, Erie, Pa., assignor to Reed Manufacturing Company, Erie, Pa., a corporation of Pennsylvania
Filed Nov. 30, 1966, Ser. No. 598,025
U.S. Cl. 125—2                         10 Claims
Int. Cl. B28d 1/16; B23b 3/22

This invention is intended to simplify the construction and increase the range of a machine for cutting and finishing the ends of asbestos cement pipe and the like.

In the drawing, FIG. 1 is a side elevation partly broken away of a pipe finishing machine, FIG. 2 is a section on line 2—2 of FIG. 1, FIG. 3 is a fragmentary end view, FIG. 4 is a fragmentary view of the expanding mandrel for gripping the pipe in its minimum diameter position, and FIG. 5 is a section on line 5—5 of FIG. 4.

In the drawing, 1 indicates an end of asbestos pipe or the like and 2, 3 indicate pairs of links or fingers pivoted to each other intermediate the ends by pins 4 and having pipe gripping outer ends 5, 6 engaging axially spaced points along the inner surface 7 of the pipe and having inner ends 8, 9 respectively pivoted to a bracket 10 fixed to a tube 11 and to a bracket 12 slidably mounted between stops 13 and 14 on the outer end of hexagonal rod 15. The pairs of fingers lie in generally radial planes distributed angularly about the axis of the rod 15, three or more pairs being used to provide centralized gripping of the inner surface 7 of the pipe. When the fingers 2, 3 are expanded into gripping engagement, the inner surface 7 of the pipe is centered with respect to the longitudinal axis of the mandrel. In the minimum diameter position shown in full lines in FIG. 4, the brackets 10, 12 are most widely separated and the links 2, 3 extend from the respective brackets toward each other with the pins 4 closest to the axis of the mandrel. In the maximum diameter position shown in FIG. 1, the links extend at an acute angle to the axis of the mandrel.

The mandrel is controlled by a handle 16 in the outer end of a nut 17 screwed onto the threaded end 18 of the rod 15. The rod 15 is nonrotatably slidable in a bushing 19 fixed in the tube 11 and a coil spring 20 arranged between a washer 21 fixed in the tube 11 and a shoulder 22 on the rod biases the nut 17 against a washer 23 at the outer end of the tube 11. Rotating the nut 17 accordingly causes reciprocation of the rod 15 which is utilized to expand and contact the fingers 2, 3 of the mandrel to grip or release the pipe as desired.

The particular mandrel shown is intended for pipe from two inches to six inches in diameter. In the minimum diameter position shown in FIG. 4, the fingers 2, 3 are folded flat against the outside of the rod, each pair of fingers being received in a slot 24 in a cam member 25 fixed to the rod 15. Since the particular mandrel has three pairs of fingers 2, 3, the cam member 25 has three slots 24. When received in the slot 24, heads 26 on pins 4 engage cam surfaces 27 on the cam member 25. In this position, the bracket 12 pivoted to the finger 3 is spaced a distance d from shoulder 13. Accordingly, when the handle 16 is turned in the direction to move the rod 15 to the right, as viewed in FIG. 4, the bracket 12 remains stationary and the cam member 25 moves to the right, wedging the heads 26 outward to spread the fingers 2, 3. The cam action continues until the cam member 25 reaches the dotted line position shown at 25' and the fingers 2, 3 then occupy the position shown in dotted lines at 2' and 3' suitable for gripping pipe of intermediate size such as three inches in diameter. During this interval, the rod 15 has travelled to the right a distance d and the shoulder 13 is brought into engagement with the bracket 12. Thereafter, further rotation of the handle 16 in the direction to retract the rod 15 within the tube 11 causes further expansion of the fingers 2, 3 to grip larger size pipe. FIG. 1 shows the fingers 2, 3 in the fully expanded position for gripping six inch pipe.

This construction provides a dual range for the mandrel which permits the same mandrel to accommodate a wider range of pipe sizes. At the smallest diameter position of the mandrel with the pivots 4, 8, 9 in substantially a straight line, the fingers 2, 3 are so close to dead center that expansion of the mandrel by forces exerted at the pivots 8, 9 is not possible. At this position, however, the cam surfaces 27 are effective to cam the fingers 2, 3 apart and continue to be effective until the fingers reach the intermediate position indicated by dotted lines 2', 3'. From this position, further expansion is effected by pressure exerted between the pivots 8 and 9 which are now in a position where the axial force between the pivots is effective to further expand the fingers so as to grip the larger sizes of pipe.

The dual range of expansion require lost motion in the thrust transmitting connections of the force applying system. Instead of having the lost motion between the bracket 12 and the stops 13, 14, the lost motion could be placed at any other thrust transmitting connection to the fingers or brackets, for example by providing an elongated slot 28 in the finger 3 for the pin 4 or by providing similar slots for the pins 8, 9. The slot 28 permits the pivot pin 4 to slide along the finger 3 so that the cam surfaces 27 can be effective to cam the fingers apart from the innermost position shown in FIG. 4. With the elongated slot 28, the lost motion between the bracket 12 and the stops 13, 14 can be eliminated.

After the pipe has been gripped by the expanding mandrel, it is machined by a turning or facing tool having a hub 29 journaled on the tube 11 by front and back ball bearings 30 and 31. The front bearing 30 which is most important for accuracy of machining, rides on an external smooth section 32 of the tube. The back bearing 31, which is of lesser importance, rides on the crests of the threads of an externally threaded section 33 on the tube. The crests of the threads are preferably flat so as to provide increased bearing surface. The hub is telescoped over the tube 11 and encloses the bearing surfaces for bearings 30, 31. Fixed to the hub 29 are radially projecting arms 34 and 35. The arm 34 carries a radially adjustable tool holder 36 which is locked in adjusted position by turning a handle 37. On the tool holder 36 are a machining tool 38 and a cut-off tool 39, the latter being adjustable by a knob 40. The arm 35 carries a similar radially adjustable tool holder 41 carrying, for example, a machining tool 42 and a taper cutting tool 43. The threaded section 33 of the tube 11 serves as a lead screw controlling the feed rate of the tools. For this purpose, there is mounted in the hub 29 opposed, split nuts 44 having screw threaded surfaces 45 presented to the threaded section 33 and biased out of contact with the screw threaded section by a spring 46. Surrounding the nuts 44 is a control sleeve 47 having cam surfaces 48 which, in the position shown in FIG. 2, force the nuts 44 into engagement with the threads 33. When the control sleeve 47 is turned 90° from the position shown in FIG. 2, the spring 46 forces the nuts 44 outward into clearance spaces 49 so that the nuts no longer engage the threads 33. In this position, the cutting tool can be freely slid along the tube 11 until the cutting tools are in the desired position. Then, by engaging the nuts 44, rotation of the cutting tool causes it to advance axially along the pipe in proportion to its rotation.

What is claimed as new is:
1. An expansible mandrel for gripping the inner surface of pipe and the like comprising, first and second members coaxial with and longitudinally spaced from each other along the axis of the mandrel, pipe gripping means having a plurality of pairs of links lying in generally radial planes distributed about said axis, the links of each pair extending toward each other respectively from the first and second members and having a pivoted thrust exerting connection to each other and respectively having a pivoted thrust exerting connection to said first and second members, the outside diameter of the pipe gripping means being a minimum when the pivots between the links are closest to said axis and the first and second members are most widely separated along said axis, axially movable force exerting means having thrust exerting connections to said members for effecting relative movement of said members along said axis to expand and contract the pipe gripping means, cam means cooperating with the links in the minimum diameter position for camming the links outward from said axis in the minimum diameter position of the pipe gripping means, said cam means being effective until the pipe gripping means is expanded to an intermediate diameter position, a thrust connection from the force exerting means to the cam means, and at least one of the thrust connections to the links and to the first and second members having lost motion taken up when the mandrel is expanded to said intermediate diameter position whereby thereafter further relative movement of the first and second members toward each other causes additional expansion of the pipe gripping means.

2. The mandrel of claim 1 in which the first and second members are respectively mounted on a tube and on a rod telescoped into the tube and the force exerting means is connected between the rod and tube.

3. The mandrel of claim 2 in which the cam means is fixed to the rod.

4. The mandrel of claim 2 in which the lost motion is between the second member and the rod.

5. The mandrel of claim 2 in which the lost motion is in one of the pivoted thrust exerting connections.

6. The mandrel of claim 3 in which the cam means has cam surfaces cooperating with the pivot connection between the fingers.

7. The mandrel of claim 2 in which the tube has an external smooth section adjacent the first member and an externally threaded section remote from the first member and the hub of a pipe machining tool is rotatably mounted on the tube by bearings respectively riding on the smooth section and on the crests of the threads of the threaded section, said hub having retractable split nuts for engaging the threaded section to serve as a lead screw.

8. The mandrel of claim 7 in which the hub is telescoped over and encloses the bearing surfaces for the bearings.

9. In combination, an arbor having at one end an expansible mandrel for gripping the inner surface of a pipe into which it is inserted, said arbor having an external smooth section adjacent said one end and an externally threaded section remote from said one end, a pipe machining tool having a hub mounted on the arbor by bearings respectively riding on the smooth section and on the crests of the threads of the threaded section, said hub having retractable split nuts for engaging the threaded section to serve as a lead screw.

10. The combination of claim 9 in which the hub is telescoped over and encloses the bearing surfaces for the bearings.

References Cited

UNITED STATES PATENTS

| 1,823,959 | 9/1931 | Steinmayer | 144—205 |
| 2,348,186 | 5/1944 | Bashore | 82—17 |
| 2,607,376 | 8/1952 | Montgomery | 144—205 X |
| 3,222,960 | 12/1965 | Gill | 82—4 |

OTHELL M. SIMPSON, *Primary Examiner.*

U.S. Cl. X.R.

82—4; 10—109; 144—205